United States Patent
Basart et al.

(10) Patent No.: US 9,137,376 B1
(45) Date of Patent: Sep. 15, 2015

(54) JOINING A TELECONFERENCE

(71) Applicant: ShoreTel, Inc., Sunnyvale, CA (US)

(72) Inventors: Edwin Basart, Los Altos, CA (US); Pascal Crausaz, San Jose, CA (US)

(73) Assignee: ShoreTel, Inc., Sunnyvale, CA (US)

( * ) Notice: Subject to any disclaimer, the term of this patent is extended or adjusted under 35 U.S.C. 154(b) by 0 days.

(21) Appl. No.: 14/508,216

(22) Filed: Oct. 7, 2014

(51) Int. Cl.
*H04M 3/42* (2006.01)
*G06F 15/16* (2006.01)
*H04M 3/56* (2006.01)

(52) U.S. Cl.
CPC ...................................... *H04M 3/56* (2013.01)

(58) Field of Classification Search
CPC ................. H04M 2203/50; H04M 2203/5009; H04M 2203/5054; H04M 2250/22; H04M 3/56
USPC ............ 379/202.01, 201.01, 203.01, 204.01, 379/88.11, 88.12; 455/416; 709/204
See application file for complete search history.

(56) References Cited

U.S. PATENT DOCUMENTS

| | | | |
|---|---|---|---|
| 6,760,423 B1 | 7/2004 | Todd | |
| 7,119,829 B2 | 10/2006 | Leonard et al. | |
| 7,499,535 B1 | 3/2009 | Ivory et al. | |
| 8,626,847 B2 * | 1/2014 | Jones et al. | 709/206 |
| 8,885,298 B2 * | 11/2014 | Yee et al. | 360/260 |
| 2007/0081651 A1 | 4/2007 | Iyer | |
| 2010/0289867 A1 | 11/2010 | Nimri | |
| 2011/0228922 A1 | 9/2011 | Dhara et al. | |
| 2012/0150956 A1 | 6/2012 | Tucker et al. | |
| 2013/0290870 A1 * | 10/2013 | Jones et al. | 715/753 |

* cited by examiner

*Primary Examiner* — Thjuan K Addy
(74) *Attorney, Agent, or Firm* — Kilpatrick Townsend & Stockton LLP

(57) ABSTRACT

A method for joining a teleconference includes receiving a schedule for the teleconference at a conferencing system. The schedule may include a start time for the teleconference and one or more conference rooms for attendees to use during the teleconference. A first message is sent from the conferencing system to the at least one communication device. The first message indicates to the at least one communication device to provide a user notification associated with the teleconference. A second message is received at the conferencing system. The second message is sent in response to an action by an attendee of the teleconference. The second message indicates to the conferencing system to initiate the teleconference with the at least one communication device or to join the at least one communication device to the teleconference.

22 Claims, 13 Drawing Sheets

JOINING A TELECONFERENCE

FIELD OF INVENTION

Embodiments described herein relate generally to methods and systems for joining a teleconference.

BACKGROUND

Conference calls allow participants at different locations to participate in a telephone call and may involve the sharing of data using audio, video, and/or web applications and resources (including e.g., data, presentation, and screen sharing). Conference calls may also include live images of the participants at one or more locations that can be viewed by other participants. A conference call may be referred to generally as a teleconference or videoconference. Scheduling conference calls, joining conference calls, participating in conference calls, and the like, can be broadly referred to as conferencing.

Conferencing has become especially important for businesses as it enables them to reduce travel costs by allowing workers from different locations to participate in joint meetings. This allows workers at different locations to work on the same project more efficiently. Eliminating the time required for travel can increase the speed of business. A typical business conference call may include an audio or video call that is coordinated with sharing of a presentation or document via the Internet or another computer network. The audio portion of the call may be carried over a conventional public switched telephone network (PSTN) and/or through the use of a voice over Internet Protocol (VoIP) service. Other resources, such as video and web, are typically provided via a computer network such as the Internet. In most systems, the management of these resources is performed by a conference bridge. A conference bridge is a machine that links conference participants and enables the sharing of resources between them. The conference bridge may also provide conferencing services such as recording and reporting functions. Multiple conference bridges may be linked to extend the size of a conference and/or to provide different types of services.

Although there are many different types of conferencing systems and many different ways to join or participate in a conference call, a typical scheduled teleconference includes assignment of a conference ID and one or more access codes by a conference bridge. The conference ID is used by the conference bridge to identify the teleconference. The access codes are used in a manner analogous to passwords. Different access codes may be used to control different access levels or privileges or to identify conference participants. The conference ID and one or more access codes are typically provided to each invitee of a conference call. At the scheduled time, each participant may call-in to the conference bridge and provide the conference ID and access code. The conference bridge verifies the information and then connects the participant to the identified conference call.

A teleconference may be scheduled to use specific resources such as a conference room. A conference room may be a shared resource that includes conferencing equipment such as a conference phone, a computer, a camera for capturing video, a display, an interactive whiteboard, and/or other devices. The display may be used to view other participants and/or to view shared data, documents, or presentations. Attendees participating in a teleconference from a conference room typically have to identify the teleconference and provide authorization (e.g., a passcode) to initiate and access the teleconference.

If not in a conference room, a participant may participate in a teleconference using a personal communication device such as a cell phone or computer. The computer may be a laptop that can be used remotely or a computer that is part of a personal workstation. In any case, a camera and/or a display may be included (either integrated as part of the communication device or separate from the communication device). In these scenarios, the participant may be identified and authorized based on login information provided during startup of the communication device or login information provided to unlock the communication device. A calendaring application running on the communication device, or an application or service that has access to calendaring information, may be used to identify a scheduled teleconference.

Rather than using access codes, some conferencing systems use hardware such as proximity sensors to determine that a presenter or another authorized user is in a conference room. The hardware identifies the presenter or authorized user so that they can be joined to the teleconference without requiring entry of a separate access code. Also, once the presenter or authorized user has been identified, some systems can match the presenter or authorized user to a particular teleconference so that a conference ID does not have to be entered.

Because of the increasing importance of conferencing, improved methods and systems are continuously desired to improve conferencing services and enhance the user experience.

SUMMARY

Embodiments described herein provide simplified methods and systems for joining a teleconference. In an embodiment, for example, a communication device can be joined to a teleconference with a single click of a button or a single tap on a screen. No special hardware is required for identification of a participant. The participant does not have to first provide a conference ID to identify the teleconference and/or an access code for authorization like conventional systems.

As an example, in accordance with an embodiment, a method for joining a teleconference includes sending an electronic invitation to participate in the teleconference to a plurality of invitees. The electronic invitation may include a start time for the teleconference and one or more conference rooms for attendees to use during the teleconference. Each conference room may be associated with at least one communication device for sharing media between the attendees during the teleconference. The at least one communication device may be a conference phone, a mobile phone, a telephone, a laptop computer, a tablet, a projector, a display, or a computing device, and the media may include at least one of audio, video, text, chat, or document sharing.

At the start time or at a predetermined period of time before the start time, a first message may be sent from a conferencing system to the at least one communication device. The first message may indicate to the at least one communication device to provide a user notification associated with the teleconference. The user notification may provide a notice related to joining the teleconference to any of the attendees in the conference room. The user notification may include at least one of an audible notification produced by the at least one communication device, a visual notification produced on a screen of the at least one communication device, a visual indicator on the at least one communication device, or a vibration produced by the at least one communication device.

In response to the user notification, someone in the conference room may activate a join conference application. The join conference application may be activated by performing at least one of pressing a button associated with the at least one communication device, responding to a prompt associated with the at least one communication device, tapping a popup on a touchscreen associated with the at least one communication device, making a gesture recognized by a sensor associated with the at least one communication device, vocalizing a command recognized by a sensor associated with the at least one communication device, or providing an identifier or a code to an access system associated with the at least one communication device.

In response to activating the join conference application, a second message may be sent from the at least one communication device to the conferencing system. The second message may indicate to the conferencing system to initiate the teleconference with the at least one communication device or to join the at least one communication device to the teleconference.

In accordance with another embodiment, a method for joining a teleconference includes receiving a schedule for the teleconference at a conferencing system. The schedule may include a start time for the teleconference and one or more conference rooms for attendees to use during the teleconference. Each conference room may be associated with at least one communication device for sharing media between the attendees during the teleconference. A first message is sent from the conferencing system to the at least one communication device. The first message may indicate to the at least one communication device to provide a user notification associated with the teleconference. The user notification may provide a notice related to joining the teleconference to any of the attendees in the conference room. A second message is received at the conferencing system. The second message may be sent in response to an action by an attendee of the teleconference. The second message may indicate to the conferencing system to initiate the teleconference with the at least one communication device or to join the at least one communication device to the teleconference.

In accordance with another embodiment, a teleconference system includes a plurality of communication devices for sharing media between a plurality of attendees during teleconferences, at least one conference bridge communicatively coupled to the plurality of communication devices, and a conferencing system. The conferencing system may be configured to receive a schedule for a teleconference, send a first message to the at least one communication device, and receive a second message. The first message may indicate to the at least one communication device to provide a user notification associated with the teleconference. The second message may indicate to the conferencing system to initiate the teleconference with the at least one communication device or to join the at least one communication device to the teleconference.

In accordance with another embodiment, a method for joining a teleconference includes receiving a schedule for the teleconference at a conferencing system, receiving a message at the conferencing system from the at least one communication device, associating the conference room associated with the at least one communication device with the teleconference based on the start time and a current time, and initiating the teleconference with the at least one communication device or joining the at least one communication device to the teleconference.

In accordance with another embodiment, a teleconference system includes a plurality of communication devices for sharing media between a plurality of attendees during teleconferences, at least one conference bridge communicatively coupled to the plurality of communication devices, and a conferencing system. The conferencing system may be configured to receive a schedule for a teleconference, receive a message from the at least one communication device, associate the conference room associated with the at least one communication device with the teleconference based on the start time and a current time, and initiate the teleconference with the at least one communication device or join the at least one communication device to the teleconference.

In accordance with another embodiment, a method for joining a teleconference includes receiving a schedule for the teleconference at a conferencing system; receiving a message at the conferencing system from a communication device; associating the communication device with the teleconference based on the attendee, the start time, and a current time; and initiating the teleconference with the communication device or joining the communication device to the teleconference.

In accordance with yet another embodiment, a teleconference system includes a plurality of communication devices for sharing media between a plurality of attendees during teleconferences, at least one conference bridge communicatively coupled to the plurality of communication devices, and a conferencing system. The conferencing system may be configured to receive a schedule for a teleconference; receive a message from a communication device; associate the communication device with the teleconference based on the attendee, the start time, and a current time; and initiate the teleconference with the communication device or join the communication device to the teleconference.

Numerous benefits are achieved using embodiments described herein over conventional techniques. For example, in some embodiments an attendee can join a teleconference without having to enter a conference ID and access code. This can increase meeting efficiency by reducing the time normally required to join a teleconference. In other embodiments, an attendee can initiate a teleconference by pressing a single button or tapping a single popup on a touchscreen. The single action can initiate an audio portion, a shared portion, and/or a video portion of the teleconference or initiate online chat between at least some of the attendees. This can also increase meeting efficiency by reducing startup time. Depending on the embodiment, one or more of these benefits may exist. These and other benefits are described throughout the specification.

DETAILED DESCRIPTION

Embodiments described herein provide improved methods and systems for joining a teleconference. Some embodiments reduce the number of steps normally required to initiate or join a teleconference. This reduces the startup time for the teleconference thus improving meeting efficiency and making the user experience more pleasant. In an embodiment, for example, a communication device in a conference room may be prompted to display a user notification when it is time to start a teleconference. The user notification may be, for example, a blinking light or a popup on a screen that may include a message such as "JOIN MEETING". By performing a single action, such as pressing a button on the communication device or tapping the popup, an attendee may be joined to the teleconference.

In another embodiment, an attendee can simply perform a single action, such as pressing a button or tapping a popup, when it is time for a teleconference to start. A conferencing system may be able to identify the correct teleconference for the attendee based on an association between the communication device and a schedule for an associated conference room. Alternatively, a conferencing system may be able to identify the correct teleconference based on an association between the communication device and the attendee. Further details of these and other embodiments are described throughout the specification.

Figure 1:
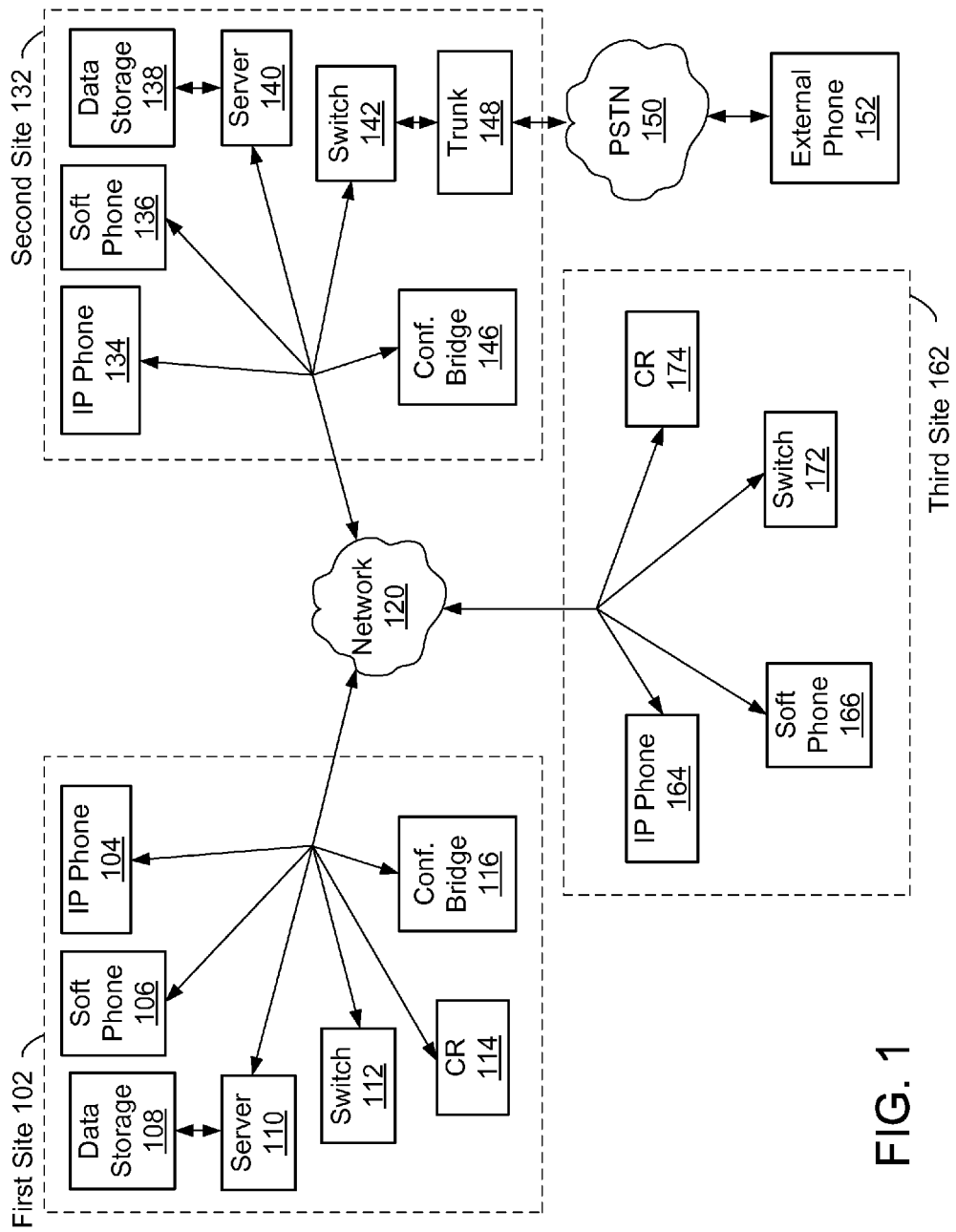
FIGS. 1-2 are simplified diagrams of exemplary communications systems in which some embodiments may be implemented.
Figure 2:
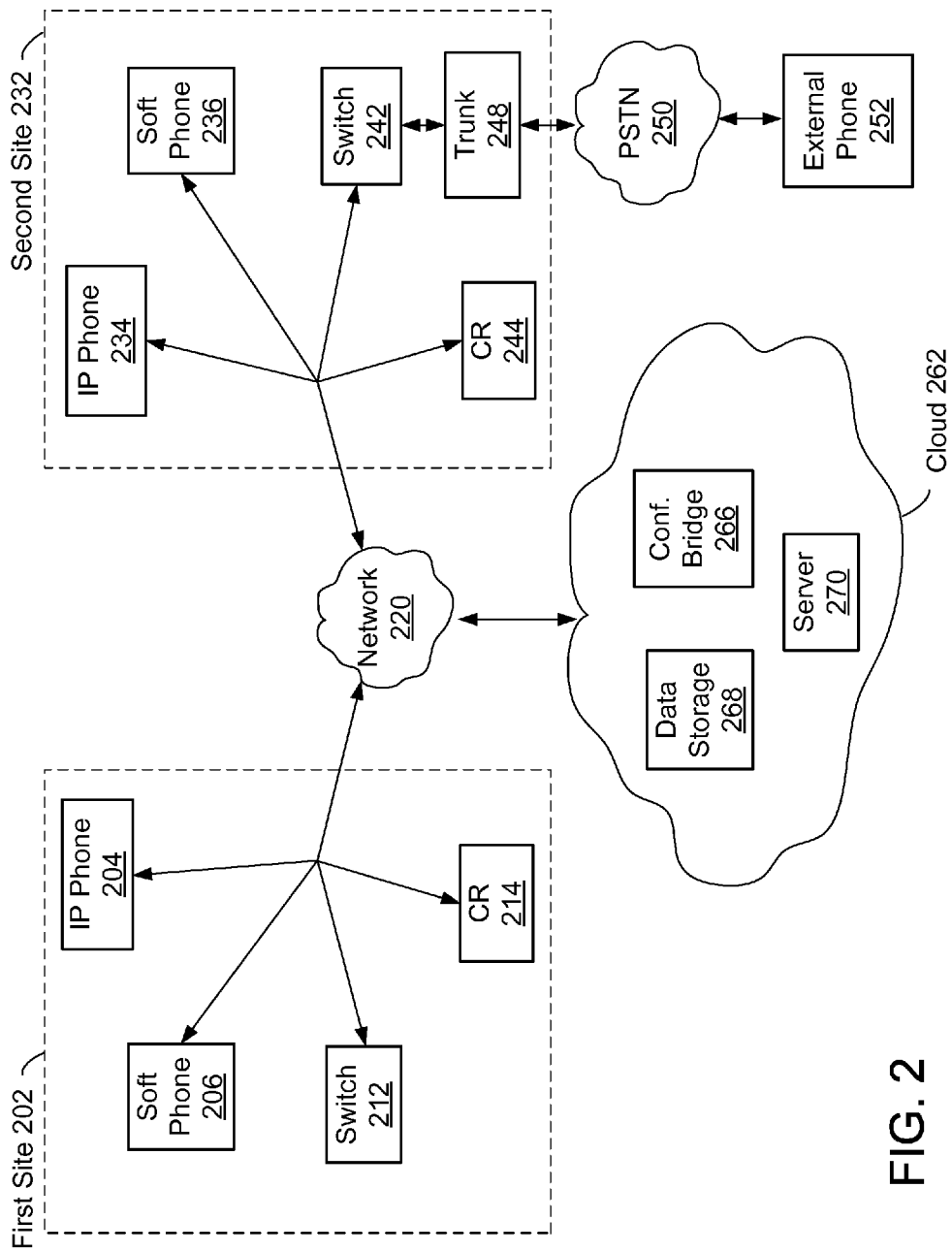

FIGS. 1-2 are simplified diagrams of exemplary communications systems in which some of the embodiments described herein may be implemented. These systems are provided merely as examples and are not intended to limit the various embodiments described herein. The system illustrated in FIG. 1 includes three groupings of devices labeled as first site 102, second site 132, and third site 162. These sites and the associated devices may form part of a VoIP system. As used herein, a site represents a grouping (e.g., a physical or logical grouping) of resources. The resources may be grouped according to location, in which case different sites may be physically distinct from each other, or they may be grouped based on other factors, in which case the different sites may or may not be physically distinct from each other. Site assignments may be used to determine primary and backup associations between the devices in the VoIP system. Assignments to provide resources within the VoIP system may be made based on site assignment, capacity, and/or a current use (or load) on a device. A teleconference system is typically not limited with regard to the different sites. For example, a conference bridge at one site may facilitate a teleconference between participants that are using devices from different sites.

While the VoIP system illustrated in FIG. 1 has three sites that each include similar devices, embodiments of the present invention are not limited to these configurations. For example, embodiments may be implemented in VoIP systems with more or fewer than three sites, and each site may include different devices and configurations compared to the other sites in the system. Differences between the sites illustrated in FIG. 1 are intended to convey the idea that embodiments described herein may be implemented using many different system and/or site configurations.

In this example, the first site 102, the second site 132, and the third site 162 are each communicatively coupled via a network 120. The network 120 may be the Internet or another packet switched network over which the VoIP system operates.

The first site 102 includes several devices including a server 110, a conference bridge 116, and a switch 112. The first site 102 also includes communication devices such as an Internet Protocol (IP) phone 104 and a soft phone 106. The IP phone 104 may be any of a number of types of communication devices such as desk phone, a smartphone, a tablet, a conference phone with one or more integrated or remote microphones and speakers, or the like. Also included within the first site 102 is a data storage device 108. Each of these devices may communicate with each other via the network 120 or via a local network.

The first site also includes a conference room 114. The conference room 114 may be a shared resource that includes conferencing equipment such as a conference phone, a computer, a camera, a display, and/or other devices. Merely by way of example, the IP phone 104 may be a conference phone that is located in the conference room 114, and the soft phone 106 may be an application running on a computer in the conference room 114. Alternatively, the conference room 114 may include other communication devices not shown in this figure.

The server 110 may be configured to provide some of the applications in the VoIP system. For example, the server 110 may be configured to provide applications such as auto attendant features, media on hold (MOH), voicemail services, email, calendaring, scheduling, and the like. The server 110 may also provide conferencing features for the conference bridge 116. The server 110 may store data in local memory or in the data storage 108.

In an embodiment, the server 110 may be linked directly to the data storage 108 as shown in FIG. 1. In another embodiment, the server 110 may be linked to the data storage 108 via the network 120 or a local network. The data storage 108 is configured to store and maintain applications and data. The data storage 108 may be any conventional storage device or database, such as those powered by My SQL, Oracle, Sybase, and the like, or any other data source such as an LDAP server.

The conference bridge 116 may be configured to link participants (e.g., users of IP phones 104, 134, 164; soft phones 106, 163, 166; and/or other endpoints as well as external phone 152) in a conference call and enable the sharing of resources between the participants. The conference bridge 116 may also provide conferencing services such as recording and reporting functions. The conference bridge 116 typically includes a number of ports each configured to provide one or more resources (e.g., audio, video, web and/or the like) to a conference participant.

The switch 112 may be a telephone switch that communicates with the IP phone 104 and the soft phone 106 to establish communications channels that are used to make and receive calls. As used herein, the term calls refers broadly to any type of communications (e.g., phone calls, video calls, text messaging, and other communications). The switch 112 may manage call setup and resource allocation by provisioning extensions for the IP phone 104 and the soft phone 106.

Other communication devices that are used to make or receive calls may also be included within the VoIP system and within each site. For example, although not shown in this example, a VoIP system may include analog or digital phones, button boxes (e.g., programmable key modules), virtual phones (e.g. extensions that are not assigned to a specific device), and other communication devices. Both fixed and mobile devices may be part of the VoIP system. Moreover, such devices may be part of the VoIP system temporarily or on a more permanent basis. For example, a desktop phone at an enterprise may be a more permanent part of a VoIP system, whereas a mobile device may be part of a VoIP system on a more transient basis (such as when the mobile device is at a particular location and/or during a certain period of time). Additionally, a call manager program may be used to make, receive, and manage calls in the VoIP system. Such a program may run on a user's phone or on a separate device. Each of the communication devices may be integrated as part of a unified communication system that provides unified communications across different devices and media types (e.g., voice, video, web, instant messaging, and the like).

The server 110, conference bridge 116, and switch 112 typically include familiar software and hardware components. For example, they may include operating systems, processors, local memory for storage, I/O devices, and system buses interconnecting the hardware components. RAM and disk drives are examples of local memory for storage of data and computer programs. Other types of local memory include magnetic storage media, optical storage media, flash memory, networked storage devices, and the like.

In some embodiments, the server 110 may include more than one server (e.g. a server cluster). Also, in some embodiments the server 110 may be configured to implement some or all of the features that are normally provided by the conference bridge 116 and/or the switch 112. Alternatively, the switch 114 may be configured to implement some or all of the features that are normally provided by the server 110 and/or the conference bridge 116.

In the VoIP system illustrated in FIG. 1, the second site 132 includes several devices including a server 140, a conference bridge 146, and a switch 142. The second site 132 also includes communication devices such as an IP phone 134 and a soft phone 136. Also included within the second site 132 is a data storage device 138. Similar to the devices within the first site 102, each of these devices may communicate with each other via the network 120 or via a local network. Each of the devices within the second site 132 may be configured in a manner similar to the corresponding devices within the first site 102 described above.

In the example illustrated in FIG. 2, the switch 142 is also coupled to a trunk 148. The switch 142 may be coupled directly to the trunk 148 or they may be coupled via the network 120 or a local network. The trunk 148 may be an analog, digital, or session initiation protocol (SIP) trunk. The trunk 148 provides an interface between the VoIP system and public switched telephone network (PSTN) 150. The trunk 148 facilitates inbound and outbound calls between endpoints within the VoIP system and endpoints outside the VoIP system (e.g., external phone 152). The external phone 152 may be any of a number of different types of communication devices such as an analog phone, a cell phone (e.g., a smartphone), a tablet, or the like.

In a similar manner, the third site 162 includes several devices including a switch 172. The third site 162 also includes communication devices such as an IP phone 164 and a soft phone 166. Similar to the devices within the other sites, each of the devices within the third site 162 may communicate with each other via the network 120 or via a local network. Each of the devices within the third site 162 may be configured in a manner similar to the corresponding devices within the first site 102 described above.

The third site 162 also includes a conference room 174 that may be configured in a manner similar to the conference room 116 at the first site 102 described above. In this example the second site 132 does not include a conference room like the other sites. As explained previously, differences between the sites are intended to convey the idea that embodiments described herein may be implemented using many different system and/or site configurations.

FIG. 1 is presented merely as an exemplary communications system to illustrate some of the features and functionality of embodiments described herein. Not all communications systems include the devices shown in FIG. 1. Likewise, some communications systems include additional devices that are not shown. For example, in some configurations, the devices shown in FIG. 1 may be combined or provide functionality that is different from that described herein. Thus, the present invention can be embodied in many different forms and should not be construed as limited to the configurations set forth herein.

In accordance with some embodiments, virtual machines may be used to replace devices in systems such as the communications system illustrated in FIG. 1. Examples of some of the devices that may be replaced by one or more virtual machines include servers, conference bridges, phone switches, SIP trunks, and the like. One of the benefits of virtual machines is that scale is essentially determined by the computing power and memory, so a single virtual machine could in theory scale from very small to very large capacities.

FIG. 2 is another example of an exemplary communications system where some of the devices are in a cloud 262. The cloud 262 allows sharing of resources between different sites (and possibly different communications systems). Devices in the cloud 262 may be physical devices or virtual machines.

This figure provides another example of a system in which some of the embodiments described herein may be implemented. The communications system includes a first site 202 and a second site 232. The first site 202 includes an IP phone 204, a soft phone 206, a switch 212, and a conference room 214. The second site includes an IP phone 234, a soft phone 236, a switch 242, a conference room 244, and a trunk 248. The trunk 248 facilitates inbound and outbound calls between endpoints within the communications system and endpoints outside the communications system (e.g., external phone 252).

In this example, neither of the sites include a conference bridge. Instead, a conference bridge 266 is provided in the cloud 262. The cloud also includes a server 270 and data storage 268. These devices may be configured to provide applications and/or services to the devices at both the first site 202 and the second site 232.

Some embodiments described herein simplify the process of joining a teleconference. Using the communications system of FIG. 1 as an example, a teleconference system in accordance with an embodiment includes a plurality of communication devices (e.g., one or more of IP phones 104, 134, 164, soft phones 106, 136, 166, and external phone 152). The IP phones, soft phones, and external phone are not limited to any particular device and may be any kind of communication device such as a conference phone, a mobile phone, a telephone, a laptop computer, a tablet, or any other computing device enabled for communications. The teleconference system may also include other communication devices such as a camera and/or a display. The communication devices may be configured for sharing media (e.g., audio, video, or document sharing) between attendees during a teleconference. The media is not limited and may also include text and chat. Also, the document sharing may include sharing a document or transferring a document. At least one conference bridge (e.g., conference bridge 116 and/or conference bridge 146) is coupled to the communication devices and configured to provide conferencing features to the communication devices. The teleconference system also includes a conferencing system. The conferencing system may be an application running on a server (e.g., server 110 and/or server 140) or an application running on one or more of the conference bridges.

The conferencing system may be configured to receive schedule information for a teleconference and to send messages to and receive messages from the communication devices. In some embodiments, the conferencing system may receive the schedule information from an application that provides calendaring functionality such as Microsoft Outlook or IBM Notes. Alternatively, the conferencing system may include a web-based application that allows a user to directly schedule conferencing resources such as conference rooms. The conferencing system may include other configurations as well.

Figure 3A:
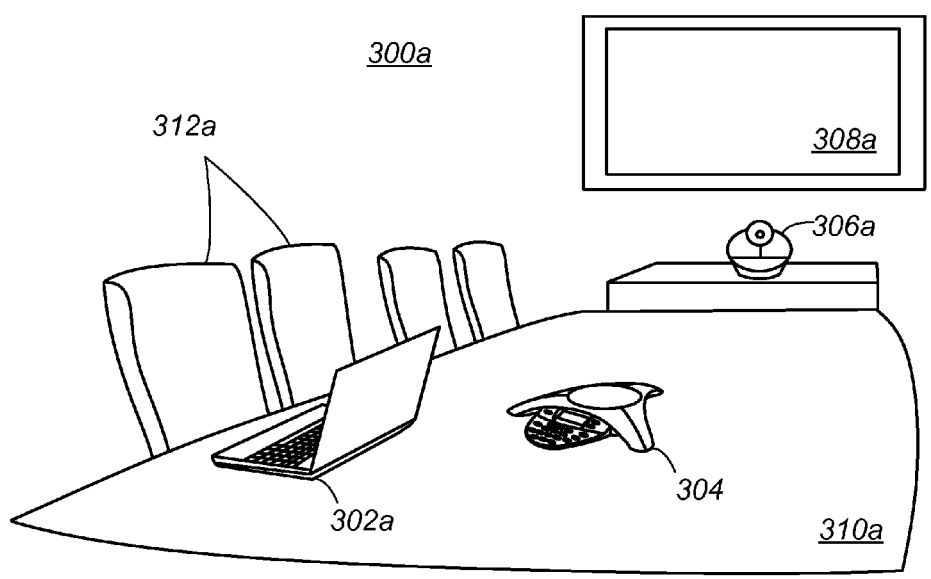
FIGS. 3A-3B are simplified diagrams of a conference room that may be used in the implementation of some embodiments.

The schedule information may include a start time for a teleconference, a list of the invitees, and/or one or more conference rooms for attendees to use during the teleconference. FIG. 3A is a simplified diagram of an exemplary conference room 300a that includes objects such as desk 310a and chairs 312a, as well as communication devices such as laptop 302a, conference phone 304, camera 306a, and display 308a. The display 308a may be a monitor or it may be a screen with an associated projector. Although not shown in this figure, the conference room 300a may also include other devices such as a multipoint control unit (MCU) for encoding a video stream from the camera 306a and decoding a video stream to the display 308a. One or more of these devices may be used to share media during a teleconference.

In some embodiments, each conference room may be associated with at least one of the communication devices. Using FIG. 3A as an example, the conference room 300a may be associated with the conference phone 304 (because the conference phone 304 is physically located within the conference room 300a). The communication device could also be the laptop 302a, the camera 306a, and/or the display 308a. These conference room-communication device associations may be provided in any known format (e.g., in a lookup table) and may be stored at one or more of the conference bridges (e.g., conference bridge 116 and/or conference bridge 146), at one or more of the servers (e.g., server 110 and/or server 140), and/or at one or more of the storage devices (e.g., data storage 108 and/or data storage 138). This information is accessible by the conferencing system and enables the conferencing system to know what meetings and resources are scheduled in the conference room(s) at each site and/or in the conference rooms within VoIP system.

Figure 3B:
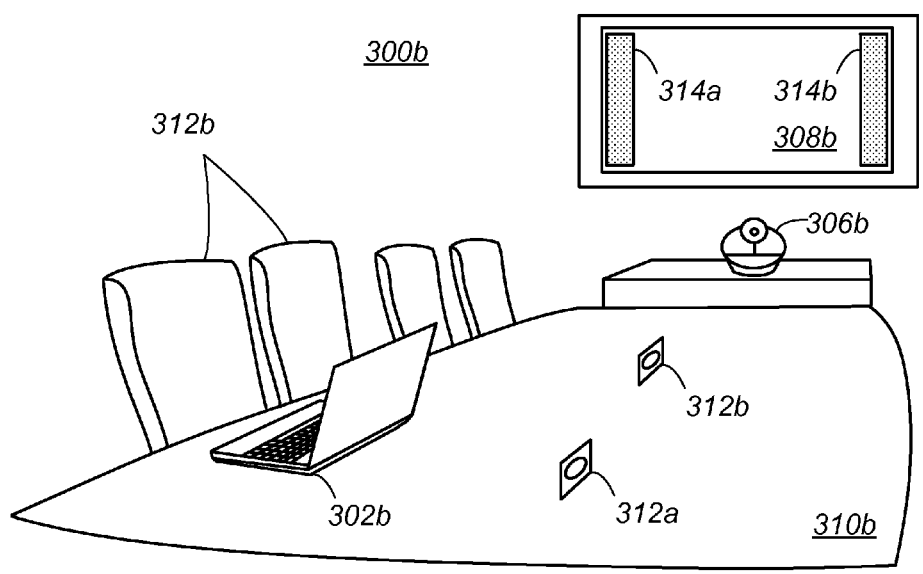

FIG. 3B is a simplified diagram of the exemplary conference room 300b with the conference phone 304 replaced by microphones 312a, 312b and speakers 314a, 314b. The microphones 312a, 312b and speakers 314a, 314b may be part of an MCU. The MCU may also include a display (not shown) for user control. The speakers 314a, 314b in this example are integrated with the display 308b, but they could be mounted, for example, in the walls or ceiling of the conference room 300b.

Figure 5A:
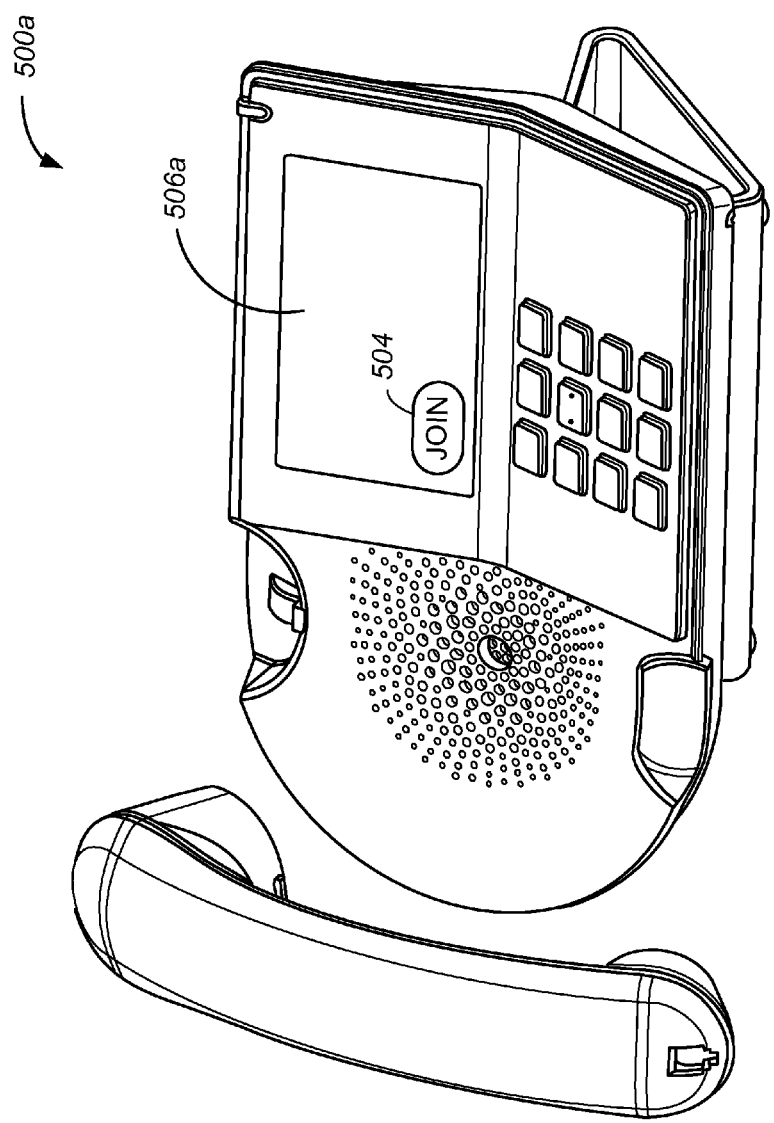
FIGS. 5A-5B are simplified diagrams of exemplary communication devices in accordance with some embodiments.
Figure 5B:
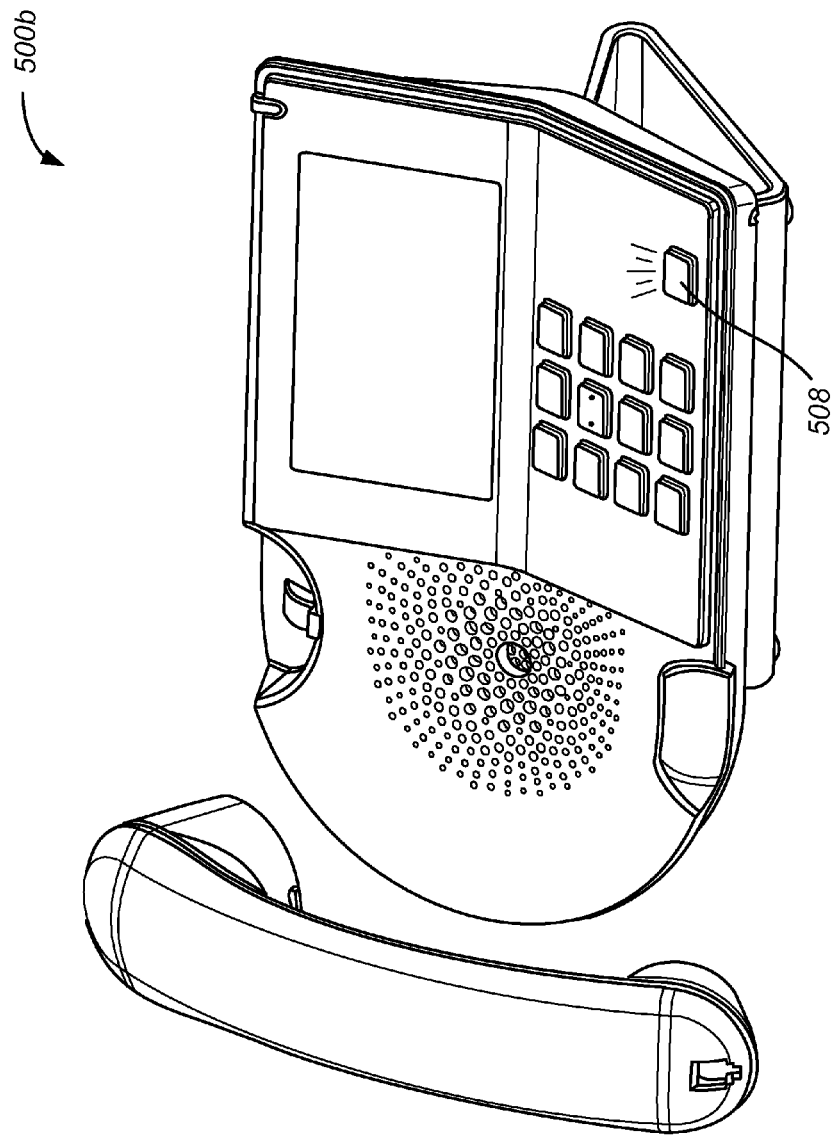

In an embodiment, the conferencing system may be configured to send messages to the communication devices based on the schedule information. For example, the schedule information may indicate that a teleconference is scheduled in conference room 300a at 12:00 PM. Using the conference room-communication device associations, the conferencing system may determine that the conference room 300a is associated with the communication device 304, and the conferencing system may send a message to the communication device 304 at 12:00 PM (or at a predetermined time before 12:00 PM). The message may indicate to the communication device 304 to provide a user notification associated with the teleconference. The message may include a network wake-up (e.g., Wake-on-LAN) to ensure that the communication device is powered on and awake to receive the message. The user notification provides a notice related to joining the teleconference to any of the attendees in the conference room. The user notification is not limited and may include an audible notification (e.g., a ring), a visual notification (e.g., a popup on a screen), a visual notification (e.g., a blinking or steady light), a vibration, or any other notification. An example of a popup on a screen is shown in FIG. 5A, which shows an exemplary phone 500a with a popup 504 on a screen 506a. An example of a visual notification is shown in FIG. 5B, which shows an exemplary phone 500b with a blinking light 508.

For ad hoc meetings, or meetings where the start time is now, the conferencing system may follow the same steps outlined above, but the message may be sent to the communication device as soon as the schedule information is received by the conferencing system. An ad hoc meeting may be a new teleconference or a scheduled teleconference that is being changed (e.g., moved to another time or to a different conference room).

Upon receiving the user notification, an attendee in the conference room may respond in a number of ways to initiate or join the teleconference. For example, the attendee may press a button associated with the communication device. The button may be on the communication device (e.g., a join meeting button) or it may be located remote from the communication device but communicatively coupled to the communication device (e.g., on a wall). As an example, in FIG. 5B the blinking light 508 may also be a button. Pressing the button may activate a join conference application that sends a message from the communication device to the conferencing system. The message may indicate to the conferencing system to initiate the teleconference with the communication device or to join the communication device to the teleconference.

Figure 6A:
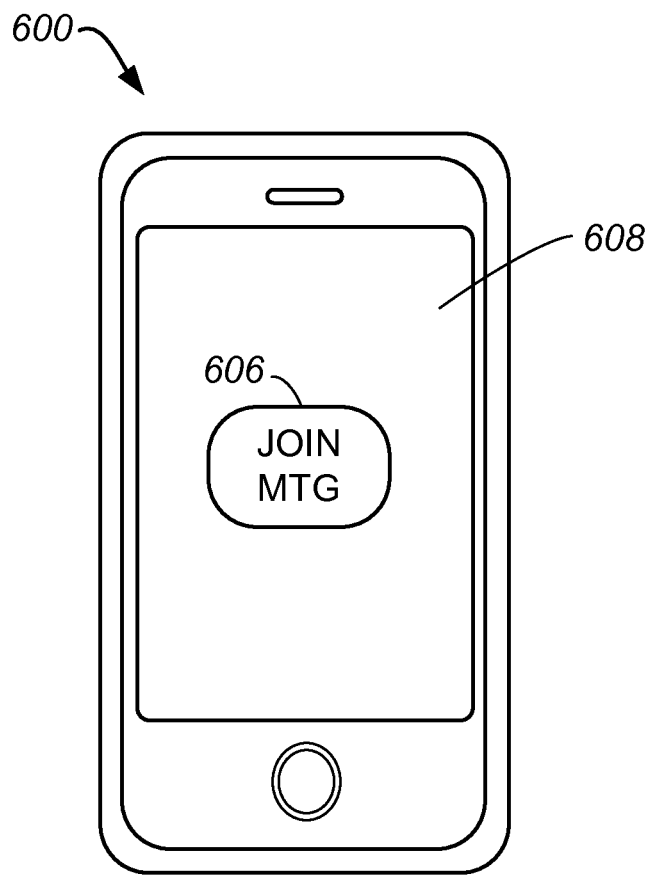
FIGS. 6A-6B are simplified diagrams of exemplary mobile communication devices in accordance with some embodiments.
Figure 6B:
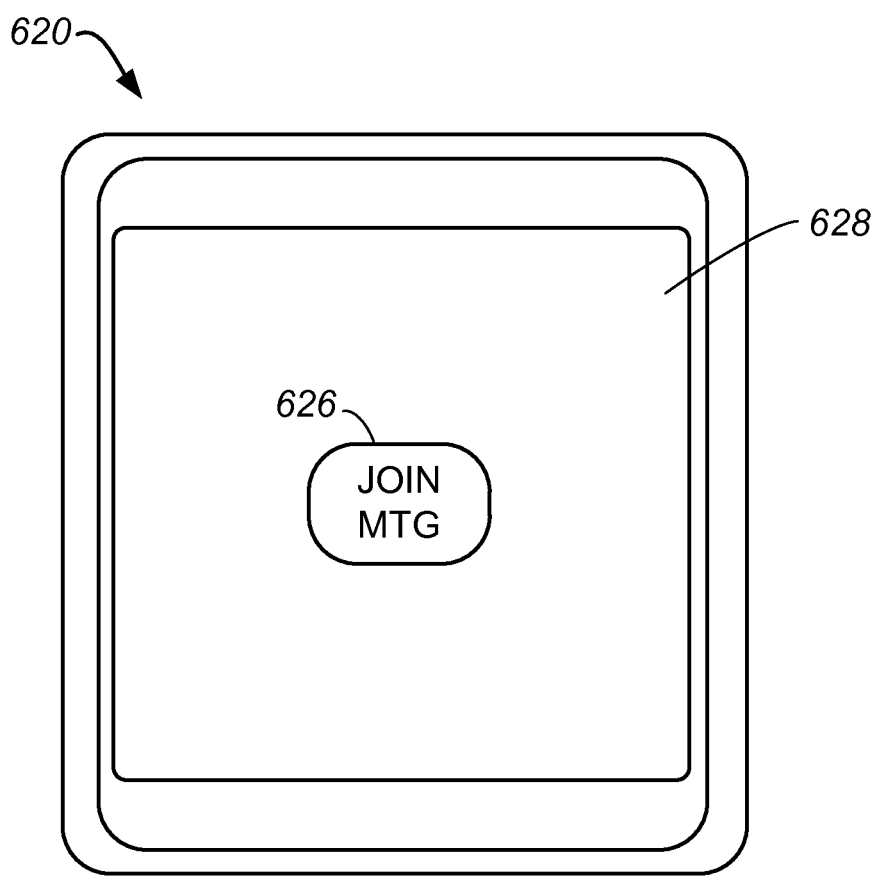

The response by the attendee is not limited to pressing a button, and could be any action that triggers a message from the communication device to the conferencing system to initiate or join the communication device to the teleconference. Some exemplary actions include responding to a prompt associated with the at least one communication device (e.g., clicking a box displayed on a screen or monitor using, for example, a mouse or remote), tapping a popup on a touchscreen associated with the at least one communication device (e.g., popup 504 in FIG. 5A), making a gesture recognized by a sensor associated with the at least one communication device, vocalizing a command recognized by a sensor associated with the at least one communication device (e.g., saying "join conference"), or providing an identifier or a code to an access system associated with the at least one communication device (e.g., a security system for the conference room). As another example, an attendee may respond to a user notification using a communication device other than the communication device that provided the user notification. For example, the attendee may have an application on a personal communication device such as a mobile phone, laptop (e.g., the laptop 302a in FIG. 3A), or other computing device that when activated can send the message to the conferencing system. Examples are shown in FIGS. 6A-6B, where FIG. 6A shows a mobile phone 600 with a popup 606 on screen 608, and FIG. 6B shows a tablet with a popup 626 on screen 628. Selecting one of the popups 606, 626 may activate the join conference application.

Upon receiving the message, the conferencing system can initiate the teleconference with the communication device or join the communication device to the teleconference. This may require the conferencing system to send a message to the conference bridge to call the communication device to start the teleconference. Alternatively, the action that initiated the response to the conferencing system may also take the communication device off-hook and establish a communication channel that can be used to connect the communication device to the teleconference.

The communication device that is used for the teleconference can be the same communication device that received the message from the conferencing system or the same communication device that sent the message to the conferencing system (if, for example, a message was received at a communication device in a conference room and a message was sent from a mobile device of the attendee). Alternatively, the response by the attendee may indicate which communication device will be used for the teleconference (e.g., choosing between one button or popup that indicates "JOIN IN CONFERENCE ROOM", another button that indicates "JOIN AT DESK", or another button that indicates "JOIN THIS DEVICE"). The conferencing system can use different numbers to connect to the different communication devices. This information can be stored in any format and made accessible to the conferencing system.

In another embodiment, a teleconference system having communication devices, one or more conference bridges, and a conferencing system may be configured to receive schedule information similar to the embodiment described above. In this embodiment, however, instead of sending a message to a communication device to provide a user notification, the conferencing system may be configured to simply receive a message from a communication device that indicates to the conferencing system to initiate a teleconference with the communication device or to join the communication device to the teleconference. The message may be sent to the conferencing system after an attendee performs one of the same actions that were described in the previous embodiment (e.g., pressing a button, responding to a prompt, tapping a popup, making a gesture, vocalizing a command, providing an identifier, or the like). Because the conferencing system knows the schedule information for the conference room, it may be configured to associate the communication device with the teleconference based on a start time and a current time. The conferencing system may also be configured to initiate the teleconference with the communication device or join the communication device to the teleconference. As described previously, this may require the conferencing system to send a message to the conference bridge to call the communication device to start the teleconference. Alternatively, the action that initiated the message to the conferencing system may also take the communication device off-hook and establish a communication channel that can be used to connect the communication device to the teleconference.

In another embodiment, a teleconference system may be configured to receive a message from a communication device similar to the previous embodiment, but the conferencing system may be configured to associate the communication device with an attendee using, for example, a lookup table that includes communication device-invitee associations. In this embodiment, the communication device-invitee associations may be used instead of the communication device-conference room associations. Because the conferencing system knows the schedule information for the attendee (or for the invitees), it may be configured to associate the communication device with a teleconference based on a start time and a current time. The conferencing system may also be configured to initiate the teleconference or join the communication device to the teleconference as described previously.

Figure 4:
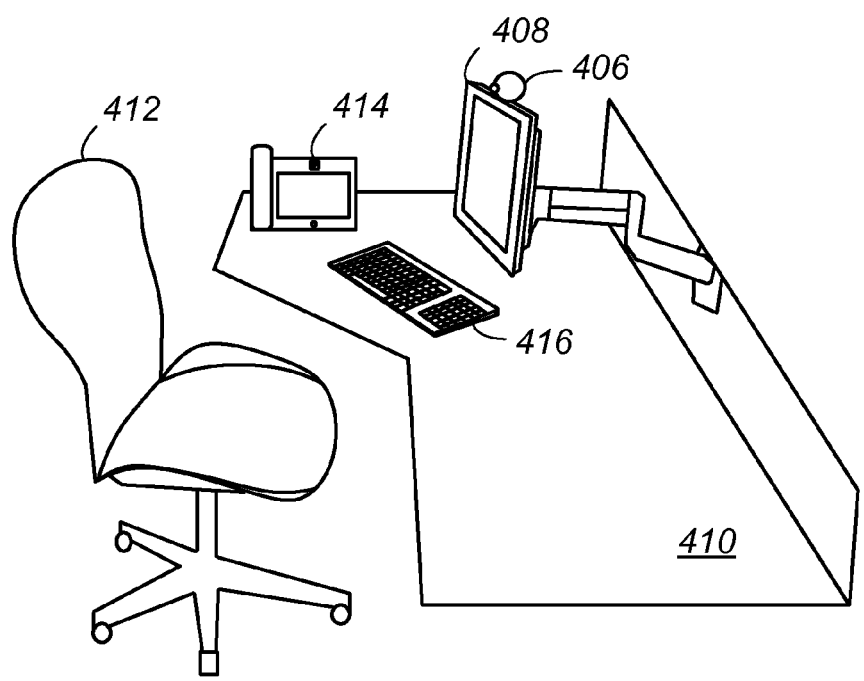
FIG. 4 is a simplified diagram of a personal workspace that may be used in the implementation of some embodiments.

An example of how communication device-invitee associations are used can be illustrated with reference to FIG. 4, which is a simplified diagram of a personal workspace that includes objects such as desk 410 and chair 412, as well as devices such as phone 414, computer keyboard 416, camera 406, and display 408. One or more of these devices may be used to share media during a teleconference. In an example, the phone 414 may be associated with an invitee (because the personal workspace is assigned to the invitee). The computer keyboard 416 and/or computer display 408 (or associated computer) may also be associated with the invitee. Additionally, a personal communication device (e.g., a mobile phone or tablet) may also be associated with the invitee and used in the communication device-invitee associations.

In another embodiment, a teleconference system having communication devices, one or more conference bridges, and a conferencing system may be configured to receive schedule information similar to the embodiments described above. In this embodiment, however, the conferencing system may be configured to simply receive an identifier (e.g., personal identifier) associated with an invitee of a teleconference, and the conferencing system may have access to identifiers associated with at least some of the invitees. Because the conferencing system knows the schedule information and the identifiers, it may be configured to associate the invitee with a teleconference based on a start time and a current time. The conferencing system may also be configured to initiate the teleconference with the communication device that was used to send the identifier or join the communication device to the teleconference.

In yet another embodiment, a teleconference system having communication devices, one or more conference bridges, and a conferencing system may be configured to receive schedule information similar to the embodiments described above. In this embodiment, however, the conferencing system may be configured to provide the schedule information to a communication device. The schedule information may include all that teleconferences scheduled during a particular time period (e.g., that day). The communication device may be configured to display the schedule information to a user who requested the information by, for example, pushing a button or tapping a screen on the communication device. The user may scroll through the teleconferences (if necessary) and choose a teleconference to join. The scheduled teleconferences may be organized in lists such as "my conferences", "this room's conferences", "another room's conferences", "my boss's conferences", and the like. Alternatively, a user may enter a particular date and time to view the teleconferences scheduled at that date and time. In some embodiments, the conferencing system may require the user to enter an identifier (e.g., personal identifier) to confirm that the user is an invitee of the selected teleconference. The conferencing system may be configured to initiate the teleconference with the communication device or join the communication device to the teleconference.

In the above examples, the communication device may be part of the same VoIP system as the one or more conference bridges or the communication device may be external to the VoIP system. When the communication device is external to the VoIP system (e.g., external phone 152 in FIG. 1), any messages sent to the communication device from the conferencing system may be in the form of a message (such as an email message) that includes a uniform resource identifier (URI). When it is time for a meeting to start (or as soon as the message is received for an ad hoc meeting), an attendee opens the message and selects the URI. This sends a message back to the conferencing system, and a web application is launched on the communication device to initiate the teleconference or join the communication device to the teleconference.

In some embodiments, a communication device that is external to the VoIP system may join a teleconference if (i) the communication device has a browser that has audio, video, and/or sharing capability; (ii) the teleconference is scheduled to include a conference room; (iii) the conference room is associated with resources; and (iv) the communication device includes a scheduling application that recognizes when the teleconference is starting. The scheduling application may identify a device in the conference room that can display a notice from the conferencing system. The scheduling application may identify the conference room from a list of invitees and have access to communication device-conference room associations that enables identification of the device associated with the conference room.

When it is time to start the teleconference, in some embodiments the external communication device receives a message that includes a URI. The URI may be a button (e.g., "JOIN CONFERENCE") or text that includes hypertext. The URI may also contain other meeting particulars such as date, time, and scheduled resources. When the URI is selected, the current time is confirmed to be within a pre/post grace period around the start time, and a list of resources (e.g., teleconference phone number, IP address of a projector, IP address of a display, and/or an IP address of a videoconference room system) is determined. The URI is posted and returns a web page with the user interface and logic for controlling the teleconference. In other embodiments, the communication device is called directly into the teleconference by the scheduling system using a standard communication protocol (e.g., SIP) to establish the call, then audio, video, and data can be sent and/or received from the communication devices using standard communication protocols.

For embodiments that use conference room-communication device associations, and in situations where the schedule information includes more than one conference room, each conference room may be joined to the teleconference upon receipt of a message by the conferencing system from one of the communication devices associated with one of the conference rooms. For example, upon receipt of a message from one communication device, calls may be placed from the conference bridge to one or more of the communication devices associated with each of the other conference rooms included in the schedule information. As another example, upon receipt of a message from a communication device associated with a host, calls may be placed from the conference bridge to one or more of the communication devices associated with each of the other conference rooms included in the schedule information. The communication device-host association may be determined based on a location (e.g., site) of the host and a location of the associated conference room, based on user preferences, or the like and may be stored with the conference room-communication device associations. In some embodiments, the communication devices may be configured to auto-answer in some or all of the conference rooms.

For embodiments that use communication device-invitee associations, each invitee may be called upon receipt of a message by the conferencing system from a communication device associated with a host of the teleconference.

Since embodiments described herein typically do not require an attendee to enter a conference ID and access code before joining a teleconference, attendee verification can be performed visually (for video conferences) or audibly by the host and other attendees.

Figure 7:
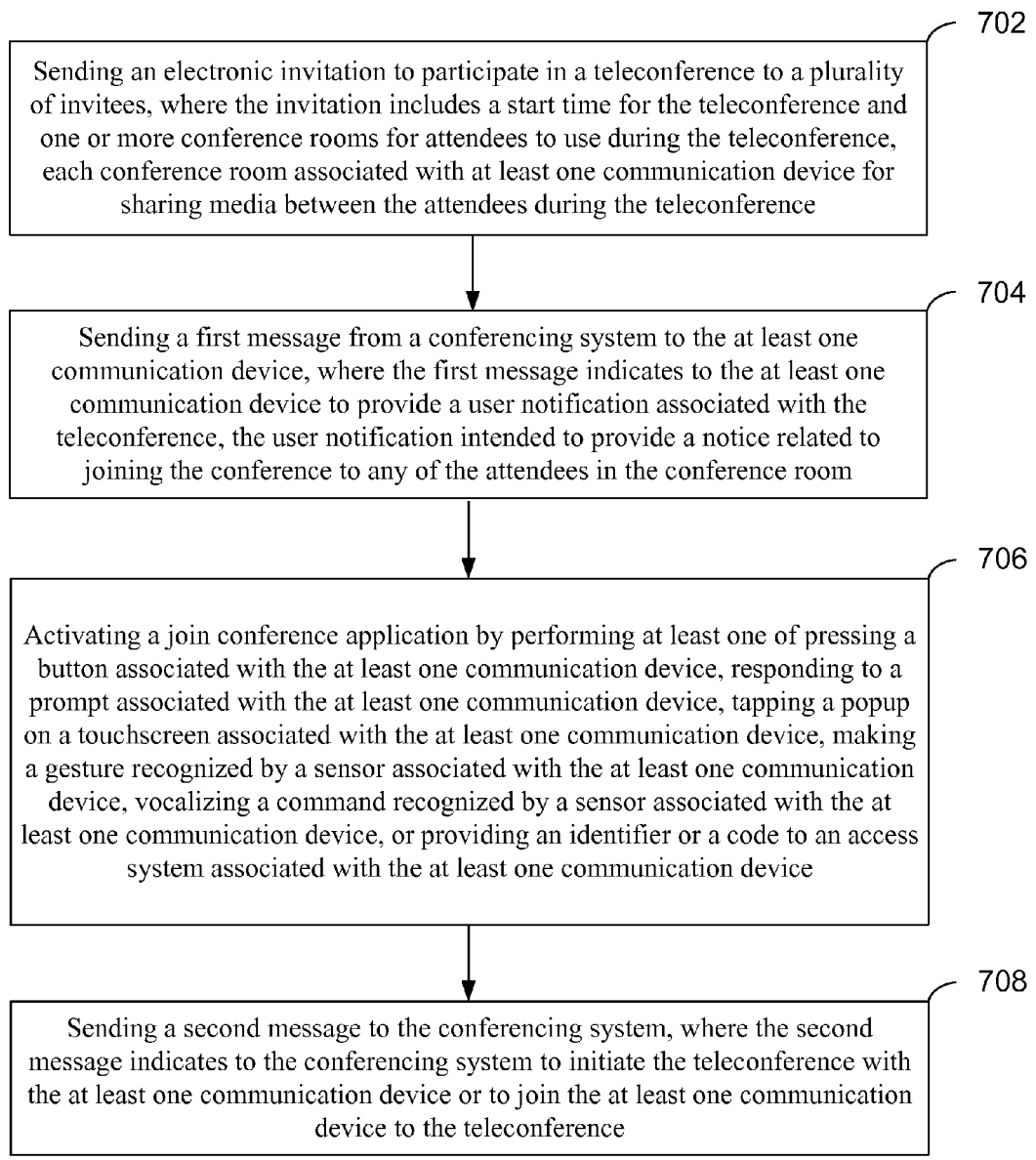
FIGS. 7-10 are flowcharts providing methods for joining a teleconference in accordance with some embodiments.

FIG. 7 is a flowchart providing a method for joining a teleconference in accordance with an embodiment. In this embodiment, a communication device in a conference room may provide a user notification when it is time to start a teleconference, and a user may join the teleconference simply by responding to the user notification.

The method includes sending an electronic invitation to participate in the teleconference to a plurality of invitees, where the electronic invitation includes a start time for the teleconference and one or more conference rooms for attendees to use during the teleconference, each conference room associated with at least one communication device for sharing media between the attendees during the teleconference (702). In an embodiment, the at least one communication device is a conference phone, a mobile phone, a telephone, a laptop computer, a tablet, a projector, or a computing device, and the media includes at least one of audio, video, or document sharing.

At the start time or at a predetermined period of time before the start time, a first message is sent from a conferencing system to the at least one communication device, where the first message indicates to the at least one communication device to provide a user notification associated with the teleconference, the user notification for providing a notice related to joining the teleconference to any of the attendees in the conference room (704). In an embodiment, the user notification includes at least one of an audible notification produced by the at least one communication device, a visual notification produced on a screen of the at least one communication device, a visual indicator on the at least one communication device, or a vibration produced by the at least one communication device. In some embodiments, the user notification may be provided again one or more times after the start time if the teleconference has not been started.

In response to the user notification, a join conference application is activated by someone in the conference room by performing at least one of pressing a button associated with the at least one communication device, responding to a prompt associated with the at least one communication device, tapping a popup on a touchscreen associated with the at least one communication device, making a gesture recognized by a sensor associated with the at least one communication device, vocalizing a command recognized by a sensor associated with the at least one communication device, or providing an identifier or a code to an access system associated with the at least one communication device (706).

In response to activating the join conference application, a second message is sent from the at least one communication device to the conferencing system, where the second message indicates to the conferencing system to initiate the teleconference with the at least one communication device or to join the at least one communication device to the teleconference (708). Attendee verification can be performed visually and/or audibly by the host and other attendees.

Figure 8:
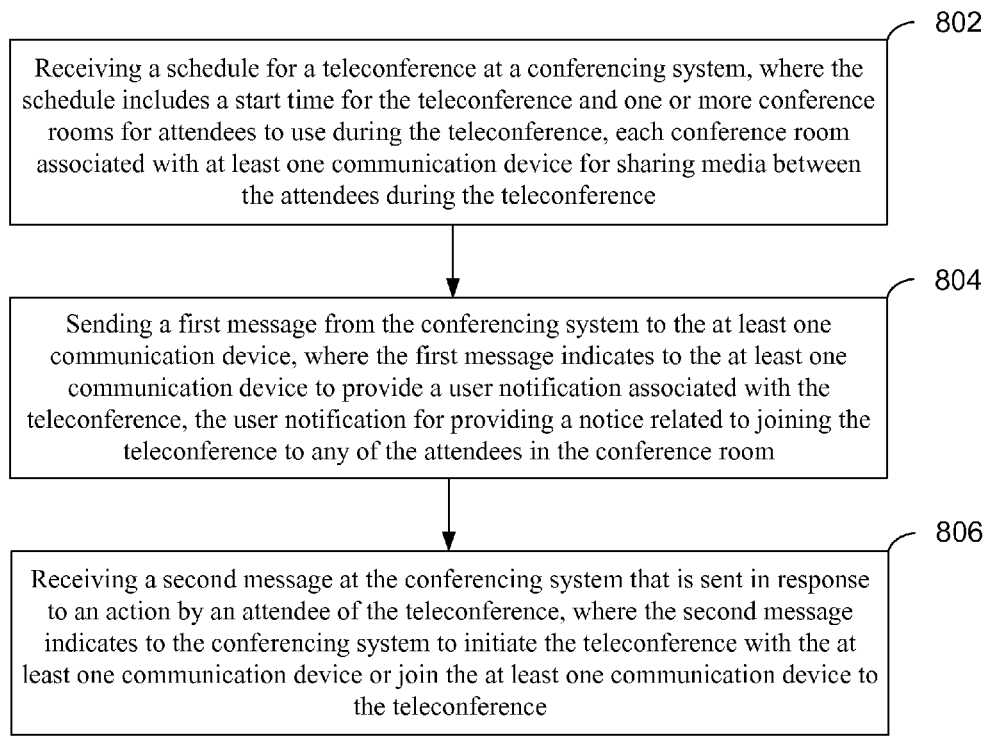

FIG. 8 is a flowchart providing a method for joining a teleconference in accordance with another embodiment. This embodiment is similar to that described above with regard to FIG. 7 in that a communication device in a conference room may provide a user notification when it is time to start a teleconference, and a user may join the teleconference simply by responding to the user notification.

The method includes receiving a schedule for the teleconference at a conferencing system, where the schedule includes a start time for the teleconference and one or more conference rooms for attendees to use during the teleconference, each conference room associated with at least one communication device for sharing media between the attendees during the teleconference (802). In some embodiments, the teleconference is an ad hoc teleconference and the start time is a current time. In other embodiments, the teleconference is a scheduled teleconference, and the first message is sent from the conferencing system to the at least one communication device at the start time or at a predetermined period of time before the start time.

A first message is sent from the conferencing system to the at least one communication device, where the first message indicates to the at least one communication device to provide a user notification associated with the teleconference, the user notification for providing a notice related to joining the teleconference to any of the attendees in the conference room (804). The first message may include a list with the schedule for the teleconference and other schedules for other teleconferences scheduled in the conference room.

A second message is received at the conferencing system that is sent in response to an action by an attendee of the teleconference, where the second message indicates to the conferencing system to initiate the teleconference with the at least one communication device or to join the at least one communication device to the teleconference (806). The second message may be sent to the conferencing system from the at least one communication device or from a device other than the at least one communication device (e.g., a personal communication device). In an embodiment, the schedule includes a list of invitees invited to participate in the teleconference, and initiating the teleconference comprises joining the at least one communication device to the teleconference and calling a communication device associated with each of the invitees. Attendee verification can be performed visually and/or audibly by the host and other attendees.

Figure 9:
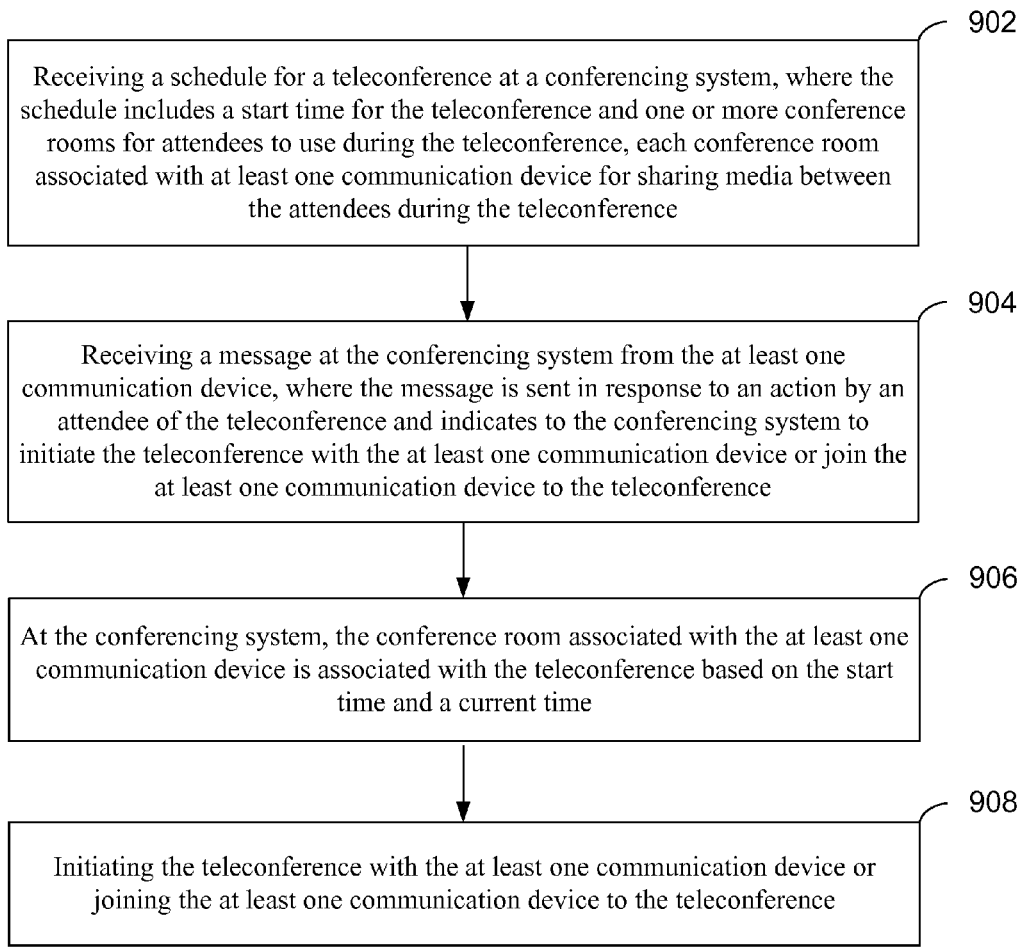

FIG. 9 is a flowchart providing a method for joining a teleconference in accordance with another embodiment. In this embodiment, a communication device may send a message to a conferencing system when it is time to start a teleconference. The communication device may be associated with a conference room, and the conference room may be associated with a teleconference based on schedule information. The communication device may be automatically joined to the teleconference.

The method includes receiving a schedule for the teleconference at a conferencing system, where the schedule includes a start time for the teleconference and one or more conference rooms for attendees to use during the teleconference, each conference room is associated with at least one communication device for sharing media between the attendees during the teleconference (902). Each conference room may be associated with at least one communication device in a lookup table accessible by the conferencing system.

A message is received at the conferencing system from the at least one communication device, where the message is sent in response to an action by an attendee of the teleconference and indicates to the conferencing system to initiate the teleconference with the at least one communication device or to join the at least one communication device to the teleconference (904).

At the conferencing system, the conference room associated with the at least one communication device is associated with the teleconference based on the start time and a current time (906).

The teleconference is initiated with the at least one communication device or the at least one communication device is joined to the teleconference (908). In an embodiment, initiating the teleconference includes calling a communication device associated with each invitees of the teleconference.

Figure 10:
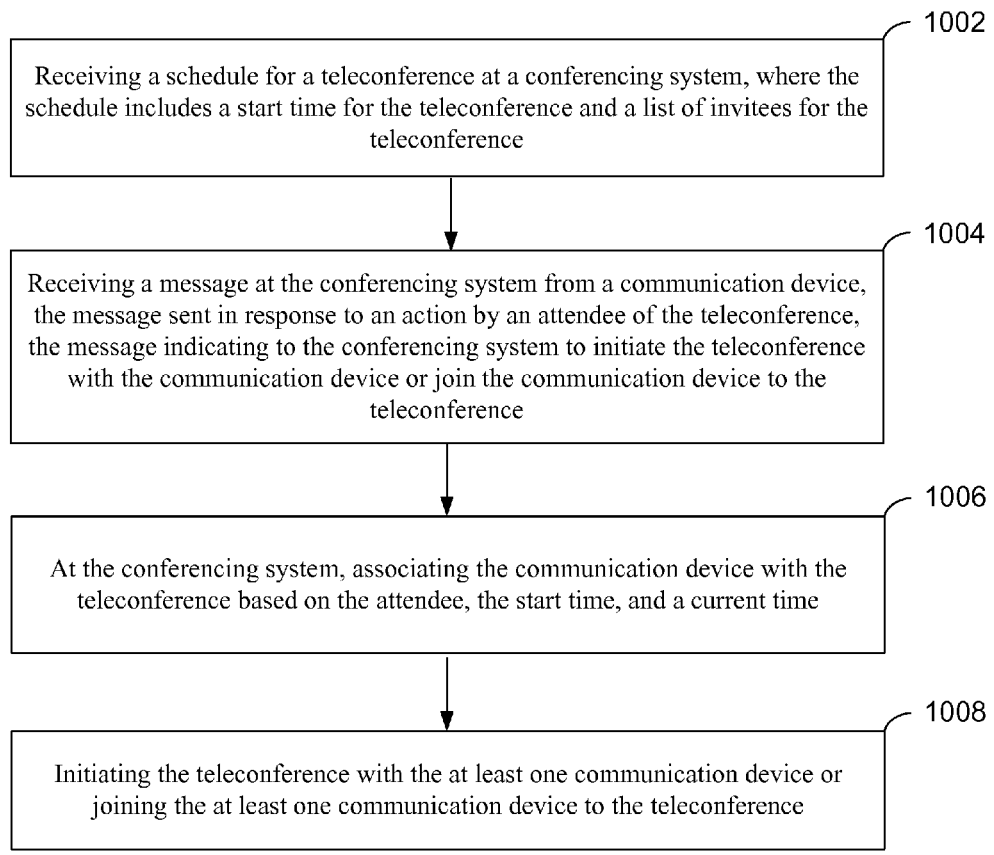

FIG. 10 is a flowchart providing a method for joining a teleconference in accordance with another embodiment. In this embodiment, a communication device may send a message to a conferencing system when it is time to start a teleconference. The communication device may be associated with an attendee, and the attendee may be associated with a teleconference based on schedule information. The communication device may be automatically joined to the teleconference.

The method includes receiving a schedule for the teleconference at a conferencing system, where the schedule includes a start time for the teleconference and a list of invitees for the teleconference (1002).

A message is received at the conferencing system from a communication device, the message is sent in response to an action by an attendee of the teleconference and indicates to the conferencing system to initiate the teleconference with the communication device or to join the communication device to the teleconference (1004).

At the conferencing system, the communication device is associated with the teleconference based on the attendee, the start time, and a current time (1006). The communication device may be associated with the attendee in a lookup table accessible by the conferencing system.

The teleconference is initiated with the communication device or the communication device is joined to the teleconference (1008). In an embodiment, initiating the teleconference includes calling a communication device associated with each of the invitees.

It should be appreciated that the specific steps illustrated in FIGS. 7-10 provide particular methods according to some embodiments. Other sequences of steps may also be performed according to alternative embodiments. For example, alternative embodiments may perform the steps outlined above in a different order. Moreover, the individual steps illustrated in FIGS. 7-10 may include multiple sub-steps that may be performed in various sequences. Furthermore, additional steps may be added or removed depending on the particular application.

It should be appreciated that some embodiments may be implemented by hardware, software, firmware, middleware, microcode, hardware description languages, or any combination thereof. When implemented in software, firmware, middleware, or microcode, the program code or code segments to perform the necessary tasks may be stored in a computer-readable medium such as a storage medium. Processors may be adapted to perform the necessary tasks. The term "computer-readable medium" includes, but is not limited to, portable or fixed storage devices, optical storage devices, wireless channels, sim cards, other smart cards, and various other non-transitory mediums capable of storing, containing, or carrying instructions or data.

While the present invention has been described in terms of specific embodiments, it should be apparent to those skilled in the art that the scope of the present invention is not limited to the embodiments described herein. For example, features of one or more embodiments of the invention may be combined with one or more features of other embodiments without departing from the scope of the invention. The specification and drawings are, accordingly, to be regarded in an illustrative rather than a restrictive sense. Thus, the scope of the present invention should be determined not with reference to the above description, but should be determined with reference to the appended claims along with their full scope of equivalents.

What is claimed is:

1. A method for joining a teleconference, the method comprising:
    sending an electronic invitation to participate in the teleconference to a plurality of invitees, the electronic invitation including a start time for the teleconference and one or more conference rooms for attendees to use during the teleconference, each conference room associated with at least one communication device for sharing media between the attendees during the teleconference, the at least one communication device being physically located within the associated conference room, where the at least one communication device is a conference phone, a mobile phone, a telephone, a laptop computer, a tablet, a projector, a display, or a computing device, and the media includes at least one of audio, video, text, chat, or document sharing;

at the start time or at a predetermined period of time before the start time, sending a first message from a conferencing system to the at least one communication device, the first message indicating to the at least one communication device to provide a user notification associated with the teleconference, the user notification for providing a notice related to joining the teleconference to any of the attendees present in the conference room, the user notification including at least one of an audible notification produced by the at least one communication device, a visual notification produced on a screen of the at least one communication device, a visual indicator on the at least one communication device, or a vibration produced by the at least one communication device;

in response to the user notification, activating, by someone in the conference room, a join conference application by performing at least one of pressing a button associated with the at least one communication device, responding to a prompt associated with the at least one communication device, tapping a popup on a touchscreen associated with the at least one communication device, making a gesture recognized by a sensor associated with the at least one communication device, vocalizing a command recognized by a sensor associated with the at least one communication device, or providing an identifier or a code to an access system associated with the at least one communication device; and in response to activating the join conference application, sending a second message from the at least one communication device to the conferencing system, the second message indicating to the conferencing system to initiate the teleconference with the at least one communication device or to join the at least one communication device to the teleconference.

2. A method for joining a teleconference, the method comprising:

receiving a schedule for the teleconference at a conferencing system, the schedule including a start time for the teleconference and one or more conference rooms for attendees to use during the teleconference, each conference room associated with at least one communication device for sharing media between the attendees during the teleconference, the at least one communication device being physically located within the associated conference room;

sending a first message from the conferencing system to the at least one communication device, the first message indicating to the at least one communication device to provide a user notification associated with the teleconference, the user notification for providing a notice related to joining the teleconference to any of the attendees present in the conference room; and receiving a second message at the conferencing system, the second message sent in response to an action by an attendee of the teleconference, the second message indicating to the conferencing system to initiate the teleconference with the at least one communication device or to join the at least one communication device to the teleconference.

3. The method of claim 2 wherein the teleconference is an ad hoc teleconference and the start time is a current time.

4. The method of claim 2 wherein the teleconference is a scheduled teleconference, and the first message is sent from the conferencing system to the at least one communication device at the start time or at a predetermined period of time before the start time.

5. The method of claim 2 wherein the first message includes a list with the schedule for the teleconference and other schedules for other teleconferences scheduled in the conference room.

6. The method of claim 2 wherein the schedule includes a list of invitees invited to participate in the teleconference, and initiating the teleconference comprises joining the at least one communication device to the teleconference and calling a communication device associated with each of the invitees.

7. The method of claim 6 wherein calling the communication device associated with each of the invitees includes sending an instant message (IM) to the communication device associated with each of the invitees or sending a pop-up message to the communication device associated with each of the invitees.

8. The method of claim 2 wherein the media includes at least one of audio, video, text, chat, or document sharing, where the document sharing includes sharing a document or transferring a document.

9. The method of claim 2 wherein each conference room is associated with at least one communication device in a lookup table accessible by the conferencing system.

10. The method of claim 2 wherein the user notification includes at least one of an audible notification produced by the at least one communication device, a visual notification produced on a screen of the at least one communication device, a visual indicator on the at least one communication device, or a vibration produced by the at least one communication device.

11. The method of claim 2 wherein the at least one communication device is a conference phone, a mobile phone, a telephone, a laptop computer, a tablet, a projector, a display, or a computing device.

12. The method of claim 2 wherein the second message is sent to the conferencing system from the at least one communication device.

13. The method of claim 2 wherein the second message is sent to the conferencing system from a device other than the at least one communication device.

14. The method of claim 2 wherein the action by the attendee of the teleconference includes at least one of pressing a button associated with the at least one communication device, responding to a prompt on a screen associated with the at least one communication device, tapping a popup on a touchscreen associated with the at least one communication device, making a gesture recognized by a sensor associated with the at least one communication device, vocalizing a command recognized by a sensor associated with the at least one communication device, or providing an identifier or a code to an access system associated with the at least one communication device.

15. The method of claim 2 wherein attendee verification is performed visually or audibly during the teleconference.

16. A teleconference system comprising:
a plurality of communication devices for sharing media between a plurality of attendees during teleconferences;

at least one conference bridge communicatively coupled to the plurality of communication devices, the conference bridge configured to provide conferencing features to the plurality of communication devices; and a conferencing system configured to:
  receive a schedule for a teleconference, the schedule including a start time for the teleconference and one or more conference rooms for attendees to use during the teleconference, each conference room associated with at least one communication device of the plurality of communication devices, the at least one communication device being physically located within the associated conference room;
  send a first message to the at least one communication device, the first message indicating to the at least one communication device to provide a user notification associated with the teleconference, the user notification for providing a notice related to joining the teleconference to any attendees present in the conference room; and
  receive a second message, the second message indicating to the conferencing system to initiate the teleconference with the at least one communication device or to join the at least one communication device to the teleconference.

17. The teleconference system of claim 16 wherein the media includes at least one of audio, video, text, chat, presentation sharing, application sharing, or document sharing, where the document sharing includes sharing a document or transferring a document.

18. The teleconference system of claim 16 wherein each conference room is associated with at least one communication device in a lookup table accessible by the conferencing system.

19. The teleconference system of claim 16 wherein the at least one conference bridge is part of a VoIP system, and the at least one communication device is external to the VoIP system.

20. The teleconference system of claim 16 wherein the plurality of communication devices include at least one of a conference phone, a mobile phone, a telephone, a laptop computer, a tablet, a projector, a display, or a computing device.

21. The teleconference system of claim 16 wherein the conferencing system is an application running on the conference bridge.

22. The teleconference system of claim 16 wherein the conferencing system is an application running on a server separate from the conference bridge, and the server is communicatively coupled to the plurality of communication devices and the conference bridge.

* * * * *